United States Patent
Melendez et al.

(10) Patent No.: US 8,659,393 B2
(45) Date of Patent: Feb. 25, 2014

(54) METHODS AND SYSTEMS FOR POSITIONING DATA FIELDS OF A RADIO-FREQUENCY IDENTIFICATION (RFID) TAG

(75) Inventors: Peter A Melendez, Aguadilla, PR (US); Steven J. Simske, Fort Collins, CO (US); Jorge E. Badillo, Aguadilla, PR (US); Alipio Caban, Aguadilla, PR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2286 days.

(21) Appl. No.: 11/464,673

(22) Filed: Aug. 15, 2006

(65) Prior Publication Data

US 2008/0061935 A1   Mar. 13, 2008

(51) Int. Cl.
*H04Q 5/22* (2006.01)

(52) U.S. Cl.
USPC .......................................... 340/10.1; 375/224

(58) Field of Classification Search
USPC ................. 340/825, 572.1–572.9, 10.1–10.6; 235/375–385
See application file for complete search history.

(56) References Cited

U.S. PATENT DOCUMENTS

| 6,970,518 | B2 | 11/2005 | Kuffner et al. |
| 2004/0179588 | A1* | 9/2004 | Kuffner et al. ................. 375/224 |
| 2004/0222878 | A1* | 11/2004 | Juels ............................ 340/10.1 |
| 2005/0108044 | A1* | 5/2005 | Koster ............................... 705/2 |
| 2006/0047961 | A1* | 3/2006 | Hashimoto et al. ........... 713/173 |
| 2006/0151592 | A1* | 7/2006 | Poor ............................. 235/375 |
| 2008/0001752 | A1* | 1/2008 | Bruns et al. ................ 340/572.1 |

* cited by examiner

*Primary Examiner* — James Yang (57) ABSTRACT

A system is provided that includes a Radio Frequency Identification (RFID) writer and a target tag within operational range of the RFID writer. The system also includes a processor coupled to the RFID writer and a memory coupled to the processor, wherein the memory stores instructions that, when executed, cause the processor to prepare a target tag value for the target tag. The target tag value comprises a position vector that identifies a positioning of data fields of the target tag value.

20 Claims, 4 Drawing Sheets

METHODS AND SYSTEMS FOR POSITIONING DATA FIELDS OF A RADIO-FREQUENCY IDENTIFICATION (RFID) TAG

BACKGROUND

Radio-Frequency Identification (RFID) is a tracking technology based on tags and tag readers/writers To "commission" an RFID tag, a tag writer may transmit a wireless signal including an identifier. The wireless signal is received by an RFID tag antenna and the identifier is stored on an RFID tag memory chip. Subsequently, the location of the tag can be tracked by tag readers based on the identifier stored on the tag. As examples, RFID technology can be used to track products shipped from one location to another, or to track vehicles that pass a highway toll.

While RFID technology is effective for tracking, counterfeiting RFID tags is possible. By counterfeiting RFID tags, unscrupulous manufacturers or distributors are able to sell fake or unauthorized products. Methods and systems that deter or detect counterfeit RFID tags are desirable.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the invention provide methods and systems to track Radio-Frequency Identification (RFID) tags and to deter counterfeit RFID tags. In at least some embodiments, an RFID tag value can be encrypted to deter counterfeiting. For example, a target tag's value can be encrypted based on a reference value stored by a reference tag located near the target tag at the time of commissioning. When a product with an encrypted tag value is transported from one location to another, an RFID tag reader is able to read the encrypted tag value, but not interpret the data. To interpret the data, a computer or server receives and decrypts the encrypted data. The computer or server also authenticates information provided by the target tag before or after decrypting the data. If decryption and authentication is successful, the product is considered to be valid, or it has followed a valid path in the supply chain for the type or family of product referred to. If decryption or authentication is not successful, the product is considered to be counterfeit, or at least potentially counterfeit, or it has not followed a valid path in the supply chain for the type or family of product referred to.

Figure 1:
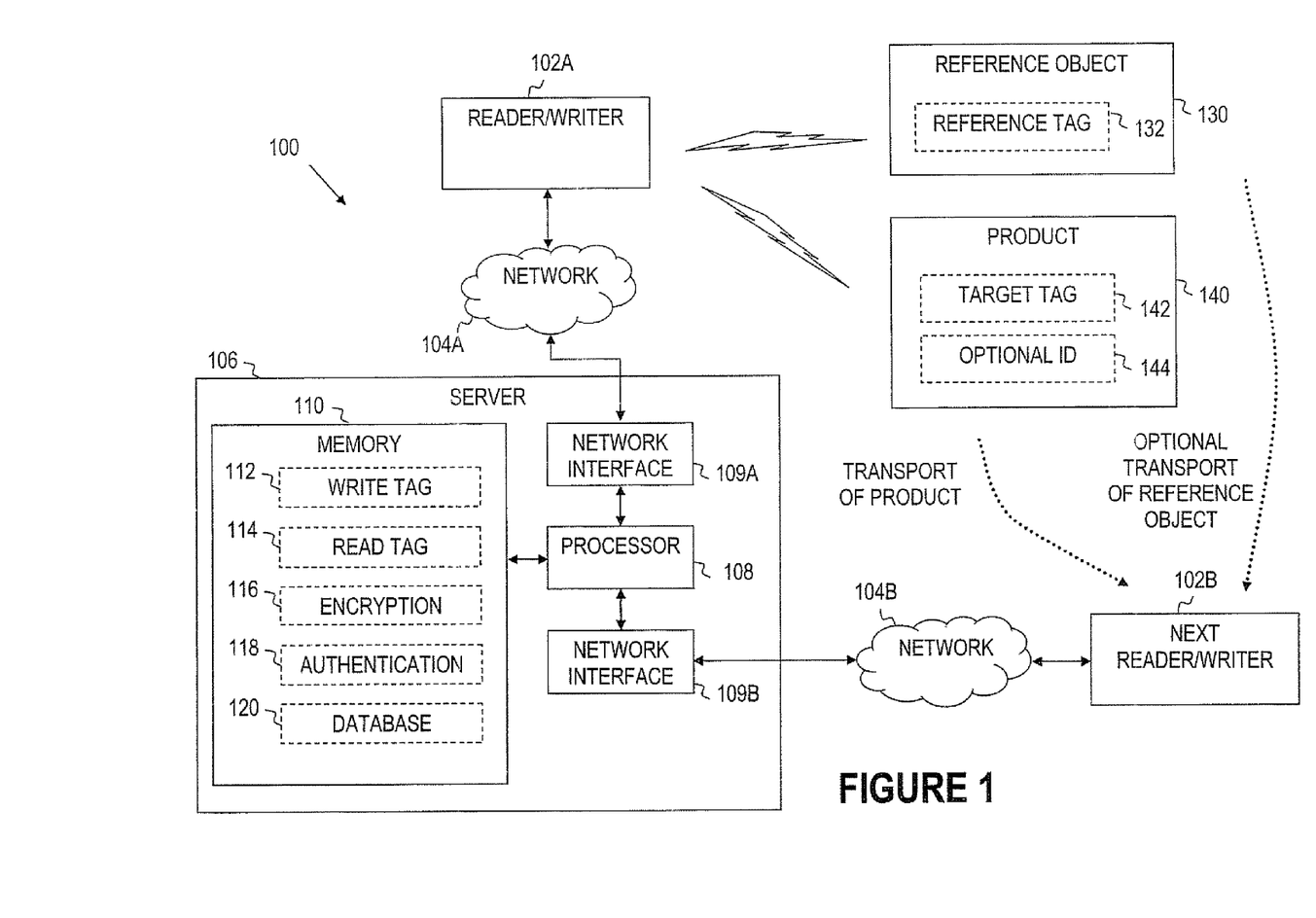
FIG. 1 shows a system in accordance with embodiments of the invention.

FIG. 1 shows a system 100 in accordance with embodiments of the invention. As shown in FIG. 1, the system 100 comprises multiple RFID reader/writers 102A, 102B that couple to a server 106 via networks 104A, 104B. The reader/writers 102A, 102B perform functions related to reading RFID tag values and writing RFID tags values while the server 106 performs control and support functions for tag reads, tag writes, tag encryption and tag authentication as will later be described. The reader/writers 102A, 102B as well as the RFID tags that are employed in the system 100 could be selected from a variety of commercially available reader/writers and RFID tags now known or later developed. Also, the reader/writers 102A, 102B and RFID tags are not limited to any particular size, shape, operational frequency, or range.

As shown, the server 106 comprises a processor 108 coupled to network interfaces 109A, 109B which enable the server 106 to transmit data to or receive data from the reader/writers 102A, 102B via the networks 104A, 104B. Although the network 104A is shown separate from the network 104B, these network components could represent a single network such as a Local Area Network (LAN), Wide Area Network (WAN), or the Internet. Similarly, although the network interface 109A is shown separate from the network interface 109B, these interface components could represent a single interface. For example, the network interfaces 109A, 109B could represent modems, modem banks, Ethernet cards, Universal Serial Bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, or other network interfaces.

The server 106 also comprises a memory 110 coupled to the processor 108. The memory 110 stores instructions and data that enable the server 106 to provide control and support functions (sometimes referred to as "middleware") for tag reads, tag writes, tag encryption and tag authentication. Accordingly, in at least some embodiments, the memory 110 stores write tag instructions 112, read tag instructions 114, encryption instructions 116, authentication instructions 118 and a database 120.

When executed, the write tag instructions 112 cause the processor 108 to prepare a value to be written to an RFID tag by a reader/writer. For example, the value can be prepared in response to a request from a reader/writer or can be prepared independently from reader/writer requests. In some embodiments, write tag instructions 112 may be based on Global Trade Item Number (GTIN) standards or Serialized Global Trade Item Number (SGTIN) standards that identify the fields or vectors for an RFID tag value. Other formats such as Serial Shipping Container Code (SSCC), Global Identifier (GID), Global Location Number (GLN), Global Returnable Asset Identifier (GRAI), Global Individual Asset Identifier (GIAI) or other existing or later developed formats may be used as well. Once the value is prepared, the server 106 sends the value to a reader/writer for transmission to and subsequent storage by an RFID tag.

When executed, the read tag instructions 114 cause the processor 108 to process a value which has been read from an RFID tag by a reader/writer. For example, the read tag instructions 114 may be based on GTIN or SGTIN standards that identify the fields or vectors of an RFID tag value. Again, other formats such as SSCC, GID, GLN, GRAI, GIAI, or other existing or later developed formats may be used as well.

Figure 2A:
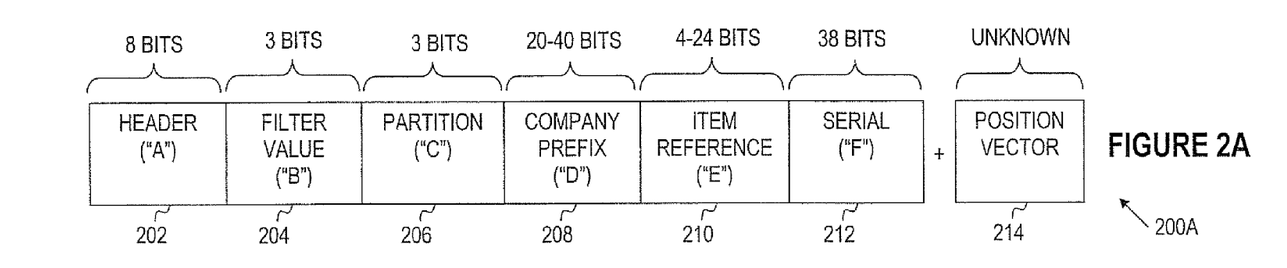
FIG. 2A shows Radio-Frequency Identification (RFID) data fields in accordance with embodiments of the invention.

FIG. 2A shows an RFID data field format 200A in accordance with embodiments of the invention. In FIG. 2A, the data field format 200A includes some fields which are standardized such as a header ("A") field 202, a filter value ("B") field 204, a partition ("C") field 206, a company prefix ("D") field 208, an item reference ("E") field 210 and a serial number ("F") field 212. In accordance with a standard SGTIN-96 bit format, the A field 202 corresponds to 8 bits, the B field 204 corresponds to 3 bits, the C field 206 corresponds to 3 bits, the D field 208 corresponds to 20-40 bits, the E field 210 corresponds to 4-24 bits and the F field 212 corresponds to 38 bits.

Figure 2B:
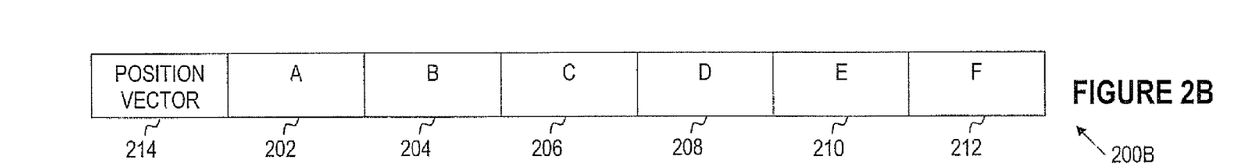
FIGS. 2B-2D show different RFID data field permutations in accordance with embodiments of the invention.
Figure 2C:
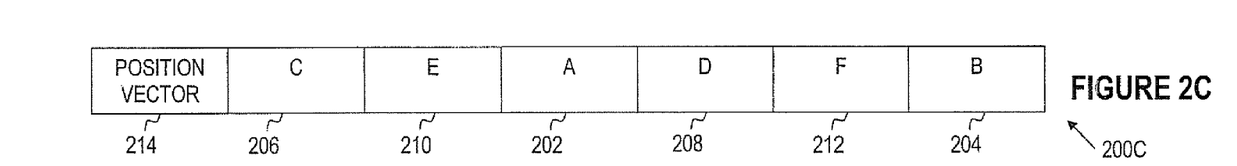
Figure 2D:
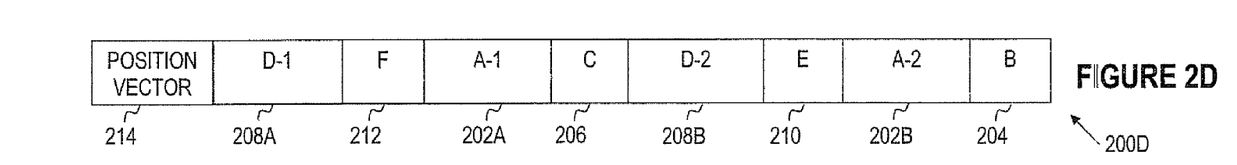

As shown, the data field format 200A also adds a position vector (or identifier) 214 which can be used to encrypt and/or to obfuscate the position of the fields A-F FIGS. 2B-2D show different RFID data field permutations in accordance with embodiments of the invention. In FIG. 2B, the data field format 200B shows the position vector 214 placed before fields A-F which are in a standard format. Even with the fields A-F in standard format, the position vector 214 would prevent correct interpretation of fields A-F if hardware/software (middleware) assigned to interpret the data field format 200B is unaware of the position vector 214 or does not know the length of the position vector 214. Also, if the position vector 214 is not found in a particular position (in relation to fields A-F) or does have a particular value, authentication of an RFID tag value could be considered unsuccessful.

In FIG. 2C, the data field format 200C shows the position vector 214 placed before fields A-F which have been scrambled at the field level (i.e., the fields are scrambled, but are still whole). As shown, the order of the fields A-F in the data field format 200C is now C, E, A, D, F, B. With the fields A-F scrambled, the position vector 214 could be decoded to identify the position of the scrambled fields such that correct interpretation of the fields is possible. Successful decoding of the position vector 214 would involve correct determination of the position vector's location, length, and interpretation. In at least some embodiments, the position vector 214 could be placed after one or more of the fields A-F. Also, embodiments are not limited to the data field format 200C of FIG. 2C. Rather, the data field format 200C illustrates that scrambling (encryption) could occur at the field level In FIG. 2D, the data field format 200D shows the position vector 214 placed before fields A-F which have been scrambled at the bit level (i.e., at least some of the fields are divided into sub-fields and the fields and sub-fields are scrambled). As shown, the order of fields and sub-fields in the data field format 200D is D-1, F, A-1, C, D-2, E, A-2, and B, where A-1 202A and A-2 202B are sub-fields of field A 202 and where D-1 208A and D-2 208B are sub-fields of field D 208. With the fields A-F scrambled at the bit level, the position vector 214 could be decoded to identify the position of the scrambled bits such that correct interpretation of the fields is possible. Again, successful decoding of the position vector 214 would involve a correct determination of the position vector's location, length, and interpretation. In some embodiments, the position vector 214 could be placed after one or more sub-fields (bits) or fields corresponding to fields A-F. Embodiments are not limited to the data field format 200D of FIG. 2D. Rather, the data field format 200D illustrates that scrambling (encryption) could occur at the bit level Returning to FIG. 1, the encryption instructions 116 stored in the memory 110 are executed by the processor 108 to establish the manner in which data fields of an RFID tag value are obfuscated or scrambled, As previously described for FIGS. 2B-2D, the encryption or obfuscation can be based on position vector's location, length, or interpretation (e.g., no encryption, a field level encryption or a bit level encryption). In some embodiments, the encryption instructions 116 operate in conjunction with the write tag instructions 112 to prepare an RFID tag value. After a tag value has been prepared (and encrypted), the server 106 sends the encrypted value to a reader/writer for transmission to and subsequent storage by an RFID tag. In at least some embodiments, the encryption instructions 116 also cause the processor 108 to perform data compression of encrypted data fields and/or the position vector 214. Appropriate use of data compression enables the position vector 214 to be added to RFID fields having a standard length (e.g., 96 bits) without extending the total length of an RFID tag value. For example, if the position vector has a length of 10 bits, fields A-F could be compressed from 96 bits to 86 bits. In this manner, the total length of the compressed standard fields plus the position vector would be the standard 96 bits. After data compression has been performed, the server 106 can send an encrypted and compressed RFID tag value along with a position vector to a reader/writer for transmission to and subsequent storage by an RFID tag.

There are many possible permutations or orderings of the different fields and sub-fields. For example, if N=the number of different fields or sub-fields ordered by the position vector, then the number (M) of possible permutations=N factorial (N!). Accordingly, the length (P) of the position vector should be capable of representing the N! permutations (i.e., $2^P >= N!$). Examples of the relationship between N, M and P are shown in Table 1.

TABLE 1

| N, the number of fields/sub-fields | M = N!, the number of permutations for ordering the fields/subfields | Minimum P (length of position vector) such that $2^P >= N!$ |
|---|---|---|
| 1 | 1 | 0 |
| 2 | 2 | 1 |
| 3 | 6 | 3 |
| 4 | 24 | 5 |
| 5 | 120 | 7 |
| 6 | 720 | 10 |
| 7 | 5040 | 13 |
| 8 | 40320 | 16 |

As shown in Table 1, 10 bits are needed for the position vector to allow arbitrary ordering of six fields (A,B,C,D,E,F). If sub-fields are used as previously described such that 8 fields or sub-fields are ordered, then 16 bits are needed for the position vector. In general, the length (P) of the position vector will depend on the number of field positions desired, the compressibility of the fields, and/or the ability to re-order the fields to increase compression. If a determination is made that the data fields are not sufficiently compressible to support a position vector with a particular length, then the number of permutations can be reduced. For example, reducing M from 720 permutations to 4 permutations would reduce P from 10 bits to 2 bits. In such case, standard data fields need only be compressed by 2 bits (instead of 10 bits) to accommodate the position vector. Ordering the fields A-F based on a 2-bit position vector is represented in Table 2.

TABLE 2

| Value of P (2-bits) | Ordering of A-F |
|---|---|
| 00 | ABC/DEF |
| 01 | CBA/DEF |
| 10 | DEF/ABC |
| 11 | DEF/CBA |

As shown in Table 2, the fields A-F can be arranged in four different permutations based on a 2-bit P value. The ordering shown in Table 2 is exemplary only and does not limit embodiments to any particular ordering. In at least some embodiments, orderings are based on looking up information in a database as described herein (e.g., matching a position vector value with an ordering stored in the database 120).

In at least some embodiments, RFID tag values are tested ("pre-flighted") before being deployed. The testing may involve field/sub-field permutations, position vectors, the compression algorithm being deployed, and/or mechanisms for ordering the fields/sub-fields. In some embodiments, the testing process ensures that all permutations of the position vector and the compression chosen will logically fit in the desired RFID bit sequence (e.g., 96 bits). Additionally or alternatively, the testing process ensures that there are no collisions between legitimate sequences (e.g., position vector+fields/sub-fields) and other sequences (e.g., standard RFID sequences+encryption). Additionally or alternatively, the testing process optimizes the ordering of the fields/sub-fields (e.g., to improve compressibility). The testing process may involve functions provided one of more of the write tag instructions 112, the read tag instructions 114, the encryption instructions 116, the authentication instructions 118, and the database 120 as described herein.

When executed, the authentication instructions 118 cause the processor 108 to process data fields which have been read from an RFID tag or have been provided during the pre-flight test. In at least some embodiments, the authentication instructions 118 identify how the position vector 214 is interpreted. For example, the authentication instructions 118 can determine if the position vector 214 has been included in an RFID tag value and if the position vector 214 is valid. If the position vector 214 is not included in an RFID tag value or is determined to be invalid, authentication of an RFID tag value fails. To interpret the position vector 214, the authentication instructions 118 may verify position vector parameters such as the position vector's location, length, or value. The authentication instructions 118 may also verify values corresponding to the fields A-F by verifying parameters related to these fields. If data fields read from an RFID tag are compressed, the authentication instructions 118 may cause the processor 108 to decompress data for the authentication process. Also, if data fields read from an RFID tag are scrambled or encrypted, the authentication instructions 118 may cause the processor 108 to unscramble the data for the authentication process.

In at least some embodiments, the authentication process performed by the authentication instructions 118 involves looking up data in a database 120. For example, the authentication instructions 118 may request that the processor 108 compare a position vector parameter such as those describe previously with predetermined parameter values stored in the database 120. If a given position vector parameter matches a predetermined parameter value stored in the database 120, authentication of the given position vector parameter is successful. Otherwise, authentication fails. Similarly, the authentication instructions 118 may request that the processor 108 compare parameters (e.g., identifiers or other data) from fields A-F with predetermined parameter values stored in the database 120. If a given parameter from fields A-F matches a predetermined value stored in the database 120, authentication of the given parameter is successful. Otherwise, authentication fails.

Continuing the discussion of FIG. 1, a product 140 is shown which can be transported from a location within range of the reader/writer 102A to a location within range of the next reader/writer 102B. The product 140 is associated with a target tag 142 located within the operational range of the reader/writer 102A. In some embodiments, the target tag 142 is already attached to the product 140. Alternatively, the target tag 142 can be attached to the product 140 a later time. The target tag 142 may already have a tag value or may have no tag value. In either case, the reader/writer 102A writes a new target tag value to the target tag 142 based, for example, on the write tag instructions 112 and the encryption instructions 116 previously described. If the target tag 142 already has a tag value, writing a new tag value may involve reading the existing tag value and updating or modifying the existing tag value. For example, the new tag value may obfuscate or encrypt standard data fields and/or update parameters such as time/date, location, company, or other parameters.

As shown, a reference tag 132 associated with a reference object 130 is also located within the operational range of the reader/writer 102A. In some embodiments, the reference object 130 may be another product located near the product 140 associated with the target tag 142. For example, the reference object 130 may be located on the same shipping pallet as the product 140. Alternatively, the reference object 130 may be fixed near the reader/writer 102A to enable the reader/writer 102A to access the reference tag 132 continuously or as needed. In at least some embodiments, the reader/writer 102A and the reference object 130 could be located near the entrance or exit of a manufacturing site or distribution site.

In at least some embodiments, the reference tag 132 stores a position vector (e.g., the position vector 214) that is used to commission or update a new target tag value for the target tag 142. Alternatively, the reference tag 132 stores a value that references a particular position vector stored in the database 120. Alternatively, the reference tag 132 stores a signature or other data that can be authenticated. After successful authentication, the server 106 selects a position vector randomly or based on predetermined criteria. For example, the predetermined criteria for selecting a position vector may be related to time/date, product, location, company, reader/writers involved, pre-flight test information or other criteria. If the target tag 142 already stores a target tag value, information from the target tag value can be considered in the process of selecting a position vector. Regardless of how a given position vector is selected, the database 120 stores information that "links" the position vector with the target tag's value for future reference in authenticating and/or decrypting the target tag's value. This linking information can be tested or pre-flighted prior to deploying an RFID tag value associated with the linking information.

For security purposes, reference tags such as the reference tag 132 can be updated or replaced periodically. Also, different reference tags and/or reference tag values could be employed to distinguish between products, reader/writers, manufacturing sites and/or distribution sites. In such case, the read tag instructions 112, the write tag instructions 114, the encryption instructions 116, the authentication instructions 118 and the database 120 enable tag reads, tag writes, tag encryption and tag authentication based on different reference tags and/or reference tag values. Another security measure involves storing information such as the fields A-F or the position vector off-line (e.g., as a stock keeping unit (SKU)-dependent feature) rather than storing information in an RFID tag or in the database 120. If information is stored off-line, the length of the position vector stored by a RFID tag can be reduced (to as far as zero) even though the fields/sub-fields have been re-ordered. This off-line information can be authenticated manually or using an authentication mechanism that does not involve the database 120.

if the database 120 is being used, information that "links" different position vectors with target tag values for future reference in authenticating and/or decrypting the target tag values can be stored in the database 120. The database 120 can be updated as needed by adding new information or by deleting information. For example, if a new reference tag value is desired, the database 120 can be updated to allow preparation and authentication of RFID tags based on the new reference tag value. Similarly, if a given reference tag value "expires," the database 120 can be updated to prevent preparation and authentication of RFID tags based on the expired reference tag value. In some embodiments, expired reference tag values could be used on a limited basis such as for tag authentication even if tag preparation is no longer permitted using the expired reference tag values. Even if an expired reference tag value is properly authenticated, the authentication instructions 118 can raise an alert or otherwise notify personnel that a potential problem exists due to the expired nature of the reference tag value. This same discussion applies to new and expired position vectors as well as reference tag values.

After the target tag 142 receives and stores an encrypted tag value, the product 140 (with the target tag 142) can be transported to another location. As previously mentioned, the reference object 130 with the reference tag 132 may be transported with the product 140 or may be fixed to a location near the reader/writer 102A. If the reference object 130 and reference tag 132 are transported with the product 140, the next reader/writer 102B may read the reference tag 132 as part of the authentication process. In some embodiments, the server 106 determines the authenticity of the reference tag's value by comparing it with linking information stored in the database 120. If the reference tag's value (or part of the reference tag's value) is successfully authenticated, the product 140 is considered to be valid. If the reference tag's value (or part of the reference tag's value) is not successfully authenticated, the product 140 is considered to be counterfeit, or at least potentially counterfeit, or the product 140 has not followed a valid path in the supply chain for the type or family of product referred to.

The authentication process also may involve reading the target tag 142 and comparing the target tag's value (or part of the target tag's value) with data stored in the database 120. In at least some embodiments, the reader/writer 102B reads the position vector 214 from either the reference tag 132 or the target tag 142 and provides the position vector 214 to the server 106 for decryption and authentication of the target tag 142.

If the reference object 130 and reference tag 132 are not transported with the product 140, the next reader/writer 102B may simply read the target tag 142 as part of the authentication process. Thereafter, the server 106 determines the authenticity of the target tag's value by comparing it with linking information stored in the database 120. In at least some embodiments, the reader/writer 102B reads the position vector 214 from the target tag 142 and provides the position vector 214 to the server 106 for decryption and authentication of the target tag 142. If the target tag's value (or part of the target tag's value) is successfully authenticated, the product 140 is considered to be valid. If the target tag's value (or part of the target tag's value) is not successfully authenticated, the product 140 is considered to be counterfeit, or at least potentially counterfeit, or the product 140 has not followed a valid path in the supply chain for the type or family of product referred to. In some embodiments, the authentication process may involve decompressing the target tag value.

Regardless of whether the reference object 130 and reference tag 132 are transported with the product 140, the target tag value stored in the target tag 142 can be modified or updated by the reader/writer 102B. For example, the target tag value can be updated to reflect that the product 140 has arrived at a particular location or at a particular time. In at least some embodiments, the tag update process involves updating the reference tag 132 or utilizing a different reference tag at the reader/writer 102B. Also, the obfuscation or encryption applied to the target tag 142 can be changed at the reader/writer 102B. Thus, the fields A-F, the position vector 214 or both can be updated as the product 140 is transported and detected by one reader/writer then the next reader/writer and so on.

Regardless of whether the reference object 130 and reference tag 132 are transported with the product 140, a separate optional identifier (ID) 144 could be attached to and transported with the product 140. The optional ID (or label) 144 could be a printed feature that is non-secure or secure, overt or covert and does not rely on the reader/writer 102B (e.g., a barcode with or without a secret key, watermarks, or guilloche pattern). In some embodiments, the optional ID 144 includes the position vector and/or other fields (e.g., fields A-F) that are used by the server 106 to authenticate the product 140. The information provided by the optional ID 144 could by encrypted and/or compressed in a manner similar to the target tag's value as previously described. If the optional ID 144 is a barcode, a barcode scanner could be used to read the optional ID.

In some embodiments, the optional ID 144 is implemented as a backup to the target tag 142. Alternatively, the optional ID 144 can add another element that must be verified as part of the authentication process. For example, authentication based on the optional ID 144 may involve use of a loupe to read microtext printing, use of ultraviolet (UV) light to detect and read invisible inks, and/or use of detection aids to read variable data coded on the printed feature. In other words, information from the reference tag 142, the target tag 142 and/or the optional ID 144 can be considered or even compared to determine product authenticity. For example, even if the optional ID 144 is not compared with the target tag's value, the authentication instructions 118 executed by the server 106 could rely on information from both the target tag 142 and the optional ID 144 for the authentication process (e.g., the position vector 214 could be read from the optional ID 144 while parameters from fields A-F are read from the target tag 142 or vice versa).

Figure 3:
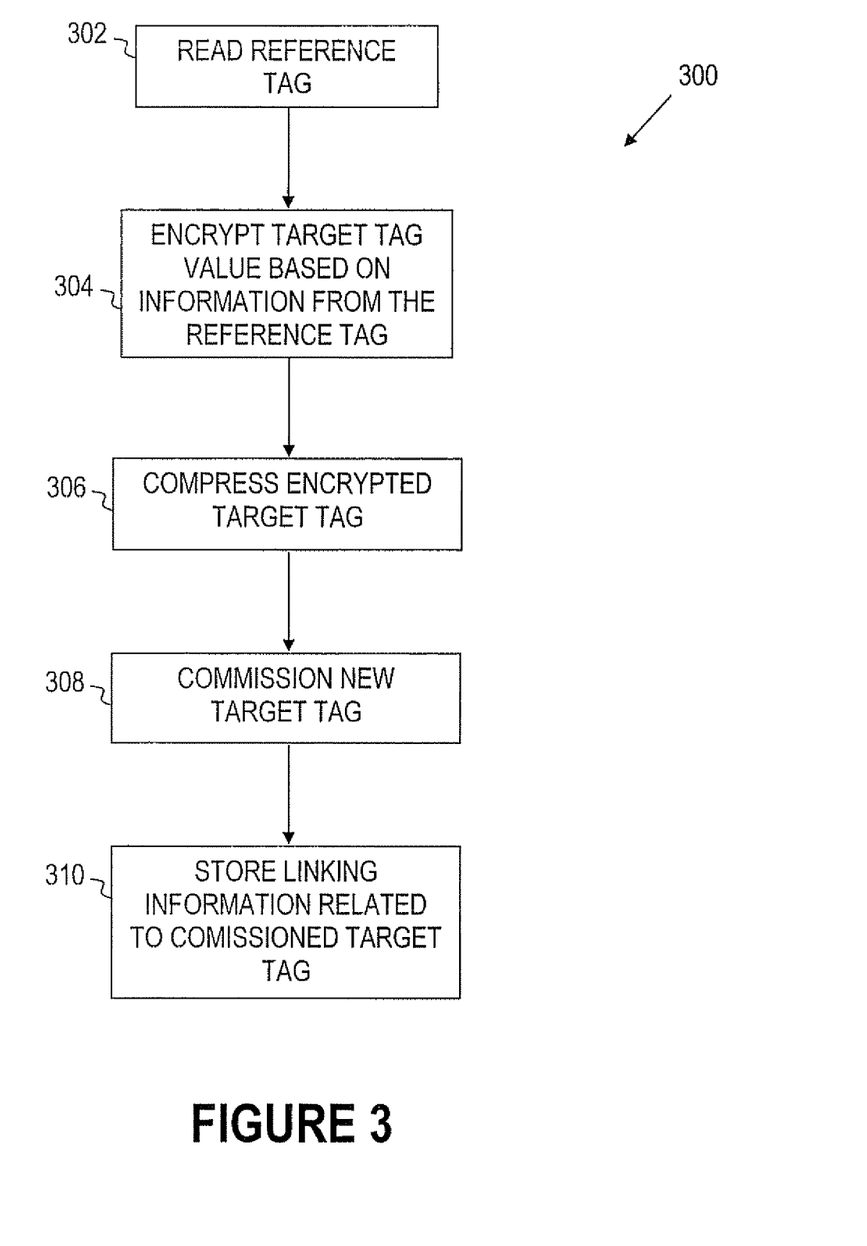
FIG. 3 shows a RFID tag commission method in accordance with embodiments of the invention.

FIG. 3 shows an RFID tag commission method 300 in accordance with embodiments of the invention. The method 300 can be performed to commission a new tag value for an RFID tag regardless of whether the tag previously stored a tag value or not. As shown in FIG. 3, the method 300 comprises reading a reference tag (block 302) and encrypting a target tag based on information from the reference tag (block 304). In at least some embodiments, the encryption is based on a position vector provided with or referenced by the reference tag. For example, the position vector's location, length or value (e.g., indicating no encryption, a field level encryption or bit level encryption) could be used to obfuscate or encrypt the target tag. Rather than provide the position vector or position vector reference, the reference tag could alternatively provide a signature or other information that must be authenticated prior to performing the encryption. The method 300 continues by compressing the encrypted target tag (block 306) and commissioning the new target tag (block 308). As part of the commissioning process, a new target tag value (encrypted and compressed) is transmitted to and stored by a target tag. At block 310, linking information related to the commissioned target tag is stored (e.g., in the database 120). This linking information can later be used for decrypting and/or authenticating the commissioned target tag.

Figure 4:
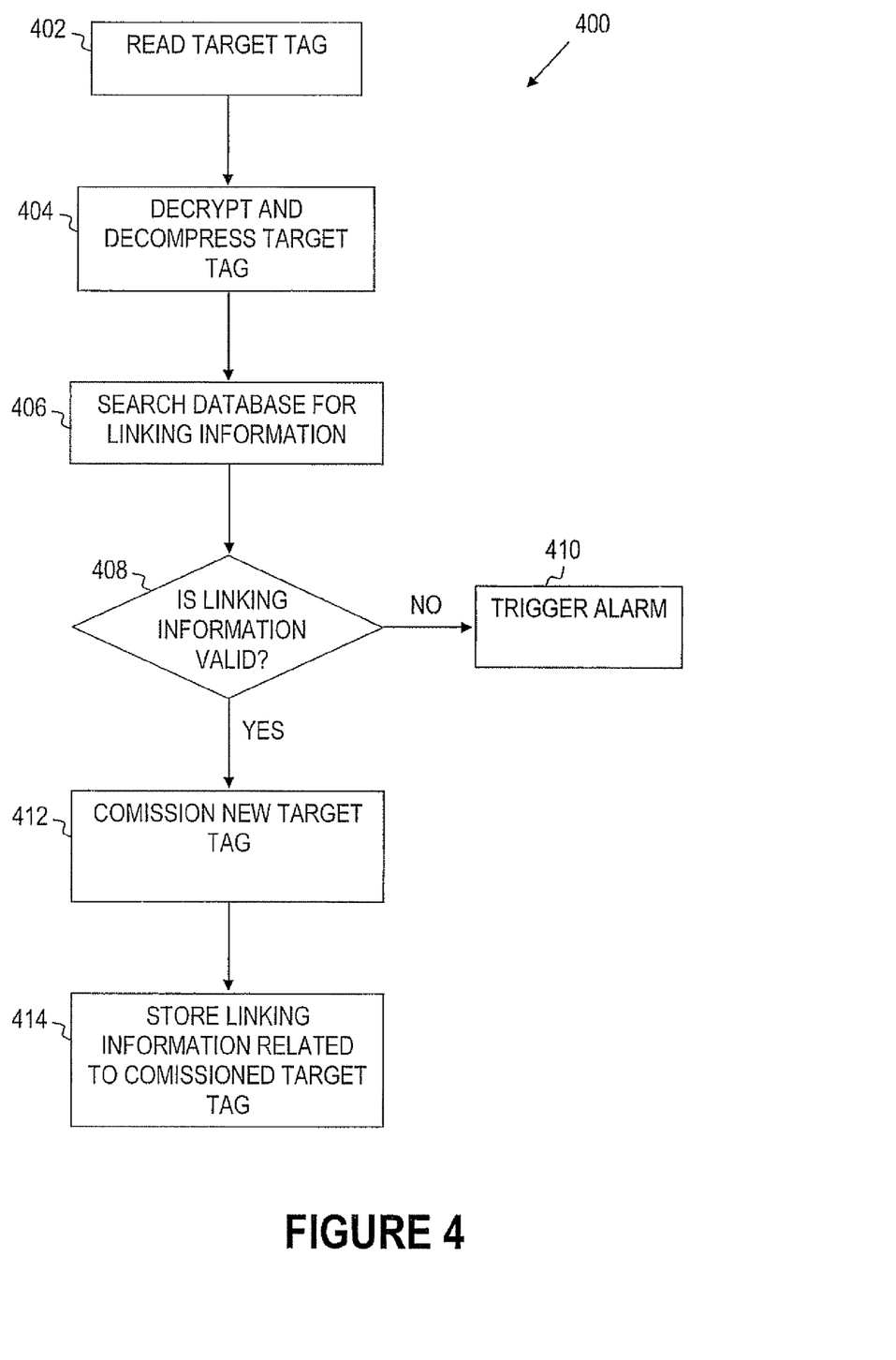
FIG. 4 shows a RFID tag verification method in accordance with embodiments of the invention.

FIG. 4 shows an RFID tag verification method 400 in accordance with embodiments of the invention. As shown in FIG. 4, the method 400 comprises reading a target tag (block 402). The method 400 then decrypts and decompresses the target tag (block 404). At block 406, a database is searched for linking information. The linking information could be, for example, a position vector or information from other data fields (e.g., fields A-F) stored by the target tag. If the linking information is not valid (determination block 408), an alarm is triggered (block 410) or some other appropriate action is taken. If the linking information is valid (determination block 408), a new target tag is commissioned (block 412). For example, the new target tag can indicate updated information (e.g., time/date, location, company or other information) and/or an updated obfuscation, encryption, or compression. At block 414, linking information related to the commissioned target tag is stored. This linking information can later be used to decrypt and/or authenticate the commissioned target tag. By commissioning target tags according to the method 300 and authenticating target tags according to method 400, counterfeit products or counterfeit RFID tags are deterred.

The above discussion is meant to be illustrative of the principles and various embodiments of the present invention. Numerous variations and modifications will become apparent to those skilled in the art once the above disclosure is fully appreciated. For example, embodiments disclosed herein describe preparing and authenticating a target tag value based on information from a single reference tag. Alternatively, preparing and authenticating a target tag value could be based on information from a plurality of reference tags. It is intended that the following claims be interpreted to embrace all such variations and modifications.

What is claimed is:

1. A system, comprising:
    a Radio Frequency Identification (RFID) writer;
    a target tag within operational range of the RFID writer;
    a processor coupled to the RFID writer; and
    a memory coupled to the processor, wherein the memory stores instructions that, when executed, cause the processor to:
        read a position identifier from a reference Radio-Frequency identification (RFID tag);
        position data fields of a target tag value to be stored on a target RFID tag based on the position identifier; and
        transmit the target tag value to the target RFID.

2. The system of claim 1 further comprising an RFID reader.

3. The system of claim 2, wherein the reference RFID tag is within operational range of the RFID reader, wherein the RFID reader reads the position identifier from the reference RFID tag.

4. The system of claim 1 wherein the target tag value is tested prior to deployment on the target tag, the test involving at least one selected from the group consisting of an anti-collision test, a compression test, a decompression test, a scrambling test, and a descrambling test.

5. The system of claim 1 wherein the position identifier identifies a field level scrambling of the data fields.

6. The system of claim 1 wherein the position identifier identifies a bit level scrambling of the data fields.

7. The system of claim 1 wherein the position identifier comprises P bits, where P is at least 2, and wherein the position identifier represents up to 2P permutations of data fields and data sub-fields associated with the target tag value.

8. The system of claim 1 wherein interpretation of the data fields is obfuscated based on at least one parameter selected from the group consisting of a location of the position identifier with respect to the data fields and a length of the position identifier.

9. The system of claim 1 wherein the memory stores instructions that, when executed, further cause the processor to compress the data fields by an amount that corresponds to a length of the position identifier.

10. The system of claim 1 further comprising a database coupled to the processor, wherein the database stores information that enables subsequent authentication of the target tag value, the authentication being based on at least one parameter selected from the group consisting of:
    a location of the position identifier with respect to the data fields, a length of the position identifier, and a value associated with the position identifier.

11. The system of claim 1 further comprising a transportable product that attaches to the target tag, wherein subsequent authentication of the target tag value after the product has been transported involves determining the position of the data fields based on information received from a reference tag transported within communication range of the product.

12. A method, comprising:
    reading a position identifier from a first Radio-Frequency Identification (RFID) tag;
    positioning data fields of a tag value to be stored on a second RFID tag based on the position identifier; and
    transmitting the tag value to the second RFID tag.

13. The method of claim 12 further comprising compressing data fields to be stored on the second RFID tag by an amount corresponding to a length of the position identifier.

14. The method of claim 12 wherein said positioning the data fields comprises scrambling the data fields at a field level.

15. The method of claim 12 wherein said positioning the data fields comprises scrambling the data fields at a bit level.

16. The method of claim 12 wherein said positioning the data fields comprises placing at least a portion of said data fields after the position identifier.

17. The method of claim 12 further comprising:
    reading the tag value from the second RFID tag; and
    authenticating the tag value by decoding the position identifier.

18. A storage medium that stores computer-readable instructions, the computer-readable instructions, when executed, cause a computer to:
- determine a position identifier;
- adjust a position of Radio-Frequency Identification (RFID) data fields based on the position identifier; and
- forward a tag value having the adjusted data fields and the position identifier to an RFID writer for transmission to an RFID tag.

19. The storage medium of claim 18 wherein the computer-readable instructions, when executed, further cause a computer to:
- compress the data fields; and
- add the position identifier to the compressed tag value, the position identifier having a length that corresponds with an amount of compression to the data fields.

20. The storage medium of claim 18 wherein the computer-readable instructions, when executed, further cause a computer to:
- authenticate the tag value by decoding the position identifier;
- if authentication is successful, prepare a new tag value for the RFID tag; and
- if authentication fails, raise an alarm.

* * * * *

UNITED STATES PATENT AND TRADEMARK OFFICE
CERTIFICATE OF CORRECTION

PATENT NO.         : 8,659,393 B2
APPLICATION NO.    : 11/464673
DATED              : February 25, 2014
INVENTOR(S)        : Peter A Melendez et al.

It is certified that error appears in the above-identified patent and that said Letters Patent is hereby corrected as shown below:

In the Claims

In column 10, line 23, in Claim 7, delete "2P" and insert -- $2^P$ --, therefor.

Signed and Sealed this
Third Day of June, 2014

Michelle K. Lee
*Deputy Director of the United States Patent and Trademark Office*